UNITED STATES PATENT OFFICE.

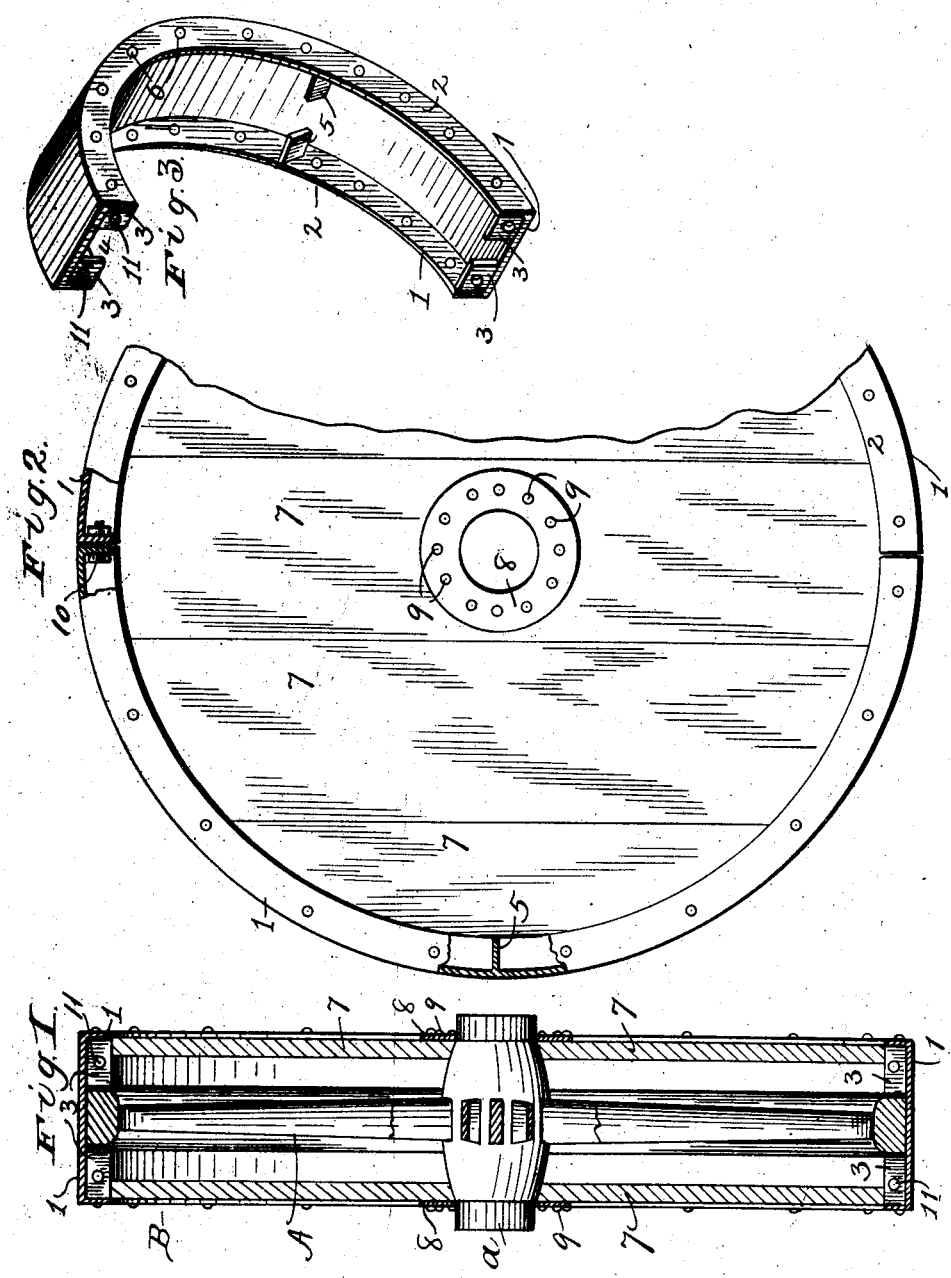

SAMUEL H. HEDDEN, OF GRAPEVINE, ARKANSAS.

VEHICLE-TIRE.

No. 839,385.

Specification of Letters Patent.

Patented Dec. 25, 1906.

Application filed April 21, 1906. Serial No. 313,071.

*To all whom it may concern:*

Be it known that I, SAMUEL H. HEDDEN, a citizen of the United States, residing at Grapevine, in the county of Grant and State of Arkansas, have invented certain new and useful Improvements in Tires, of which the following is a specification.

This invention relates to new and useful improvements in vehicle-tires, and it particularly contemplates a tire designed for use on wet or boggy roads and which can be attached to a tire of standard size incapable of use on such roads.

The invention particularly pertains to tires or wheels used in connection with log-hauling wagons and the like. In those parts of the countries where lumbering is the main industry it is not possible to accomplish much work in the wet season. This is due to the fact that in hauling logs wheels of standard size sink into the wet or boggy ground, and thus impede the progress of the work.

It is therefore the object of the present invention to eliminate the above objections by the provision of a tire which shall present so great a bearing-surface or tread to the ground as to render it practically impossible for the wheel to sink to any noticeable depth.

A subsidiary object resides in the provision of a tire of the character set forth which may be attached to any wheel of standard size and likewise detached therefrom without the expense of much time or labor.

It is a further object to provide a tire of this character which shall be light and strong and comparatively inexpensive to manufacture.

The detailed construction will appear in the course of the following description, in which reference is had to the accompanying drawings, forming a part of this specification, like characters designating like parts throughout the several views, wherein—

Figure 1 is a vertical sectional view showing the application of my improved tire to a wheel of standard size. Fig. 2 is an elevation of the same, partly in section and partly broken away; and Fig. 3 is a reduced perspective view of one of the halves of the tire, showing the construction thereof in detail.

In the practical embodiment of my invention the letter A designates a wheel of standard size in connection with which my improved tire B is employed. The tire B comprises two sections 1, which are counterparts in construction. Each section 1 is semicircular in side elevation and supplements the opposing section to form a complete tire. To this end the sections 1 are formed with inwardly-extending semi-annular flanges 2 at the sides of their periphery. Each section 1 is formed at its free ends with downwardly-extending flanges 3 of the same depth as the flanges 2, but spaced away from one another so that a recess 4 occurs for the reception of the wheel A of the vehicle. Within the body portion of each section 1 are inwardly-extending lugs 5, similarly arranged to the flanges 3 and coextensive therewith.

The sections 1 are formed in each of their peripheral flanges 2 with a series of openings 6, through which extend means for securing between said sections wooden slats 7, extending transversely of the wheel. The middle slat is formed with an approximately central opening for the reception of the adjacent end of the hub a of the wheel A. Surrounding the ends of said hub on the exterior surfaces of the slats 7 are collars 8, which reinforce the structure centrally and are secured to the adjacent slat by any approved fastening means, as at 9.

The tread of each section 1 is designed to be of several times greater width than the vehicle-wheel which the sections surround in order to present the greatest degree of bearing-surface to the wet ground, and thus prevent the wheel from sinking in.

The slats 7 serve, primarily, the functions of connecting the sections, but aside from this function they serve as mud-guards for the interior of the structure. If desired, further connections between the sections may be had by the employment of bolts 10, designed to pass through registering apertures 11 in the flanges 3 in their confronting relation.

Having fully described my invention, I claim—

1. A device of the type set forth comprising semi-annular sections, designed to fit over the wheel of a vehicle, and means extending transversely of the wheel between said sections and serving to unite the same.

2. A device of the type set forth, comprising a pair of semi-annular sections designed to fit over a wheel of a vehicle in relatively supplementary relation, means for binding said sections upon said wheel and means extending transversely of the wheel and uniting the sections.

3. A device of the type set forth, comprising a pair of semi-annular sections designed to fit over a vehicle-wheel in confronting relation, means carried by said sections for binding the same upon the wheel, semi-annular flanges formed at the sides of each section and connecting members extending transversely between the flanges and having connection therewith.

In testimony whereof I affix my signature in presence of two witnesses.

SAML. H. HEDDEN.

Witnesses:
E. H. VANCE, Jr.,
ALMA RODGERS.